(12) United States Patent
Siegwart et al.

(10) Patent No.: US 8,854,952 B2
(45) Date of Patent: Oct. 7, 2014

(54) REALLOCATING SECONDARY DESTINATIONS ON A NETWORK SWITCH

(75) Inventors: David K. Siegwart, Eastleigh (GB); Rajini Sivaram, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/334,862

(22) Filed: Dec. 22, 2011

(65) Prior Publication Data

US 2013/0163408 A1 Jun. 27, 2013

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 4/00* (2009.01)

(52) U.S. Cl.
USPC .......................................... 370/221; 370/328

(58) Field of Classification Search
None
See application file for complete search history.

(56) References Cited

U.S. PATENT DOCUMENTS

| 7,881,184 | B2 | 2/2011 | Owens et al. | |
|---|---|---|---|---|
| 8,560,693 | B1* | 10/2013 | Wang et al. | 709/226 |
| 2006/0206602 | A1 | 9/2006 | Hunter et al. | |
| 2006/0218326 | A1 | 9/2006 | Tanaka | |
| 2007/0147294 | A1* | 6/2007 | Bose et al. | 370/329 |
| 2007/0165520 | A1 | 7/2007 | Messing et al. | |
| 2010/0074099 | A1 | 3/2010 | Balasubramanian et al. | |
| 2010/0180161 | A1 | 7/2010 | Kern et al. | |
| 2011/0185065 | A1* | 7/2011 | Stanisic et al. | 709/226 |

OTHER PUBLICATIONS

Brocade.com, "ServerIron ADX Server Load Balancing Guide" [online]. Release 12.0.00, Jun. 15, 2009, [retrieved on Dec. 21, 2011]. Retrieved from the internet:<URL: http://www.brocade.com/support/Product_Manuals/ServerIron_SLBGuide/slb.2.28.html> Chapter: Server Load Balancing, Section: IP Load Balancing.
Cisco Systems, Inc., "Data Center Blade Server Integration Guide" [online]. Text Part No. OL-12771-01, Copyright 2006 Cisco systems Inc., San Jose, CA, [retrieved on Dec. 5, 2011]. Retrieved from the internet:<URL: http://www.cisco.com/en/US/docs/solutions/Enterprise/Data_Center/DC_BladeServer/BladServ.pdf> Chapter 2, pp. 33-34, Figures 2-10 and 2-11.
IBM Corporation, "RackSwitch G8264 Application Guide" [online], First Edition (Nov. 2011), [retrieved on Dec. 22, 2011]. Retrieved from the internet:<URL: http://www.bladenetwork.net/userfiles/file/G8264_AG_6-8.pdf> Chapter 19, pp. 237-244.

(Continued)

*Primary Examiner* — Faruk Hamza
*Assistant Examiner* — Diane Lo
(74) *Attorney, Agent, or Firm* — Matthew F. Mottice

(57) ABSTRACT

A method, system and program product that in response to a segmented server going offline reallocates only those primary and secondary destinations that need to be reallocated on an evenhanded basis, so there is at most a difference of one in the number of buckets allocated to each segmented server before and after re-allocation.

18 Claims, 10 Drawing Sheets

(56) References Cited

OTHER PUBLICATIONS

IBM, Emulex, "Virtualized High Availability and Disaster Recovery Solutions" [online], Copyright 2008 by International Business Machines Corporation, [retrieved on Sep. 1, 2011]. Retrieved from the internet:<URL: http://www.emulex.com/artifacts/b2c18954-b970-4900-bcea-218788b13bf2/hyper-v_poc_solutionbrief.pdf>.

Nortel Network, "Alteon OS 21.0 Application Guide" [online], Part No. 24R9742, Mar. 2006, Santa Clara, CA, [retrieved on Dec. 21, 2011]. Retrieved from the internet:<URL: http://download.boulder.ibm.com/ibmdl/pub/systems/support/system_x_pdf/24r9742.pdf> Chapter 10, pp. 171-208.

Wikipedia, "Blade server", Published on: Feb. 23, 2011, Wikipedia, the free encyclopedia. Retrieved from the internet:<URL: http://en.wikipedia.org/w/index.php?title=Blade_server&oldid=415527916>.

Wikipedia, "Load balancing (computing)", Published on: Mar. 3, 2011, Wikipedia, the free encyclopedia. Retrieved from the internet:<URL: http://en.wikipedia.org/w/index.php?title=Load_balancing_%28computing%29&oldid=416923672>.

Wikipedia, "Network switch", Published on: Mar. 1, 2011, Wikipedia, the free encyclopedia. Retrieved from the internet:<URL: http://en.wikipedia.org/w/index.php?title=Network_switch&oldid=416486270>.

\* cited by examiner

FIG. 6

REALLOCATING SECONDARY DESTINATIONS ON A NETWORK SWITCH

FIELD OF THE INVENTION

The present invention relates generally to a network switch and more specifically to a program for reallocating secondary destinations on a network switch.

BACKGROUND

In the known art, network switches employ hash tables to map keys to destinations in order to carry out load balancing across a bladecenter. The key is normally a source IP address or combination of IP addresses associated with destinations. The destination of a key is the current or initial destination to which the traffic is being redirected by the switch for the given key. Known hash tables may map a given key to a bucket in the hash table, with the bucket containing the value of a destination.

If a destination goes offline, keys currently allocated to that destination are distributed amongst the remaining online destinations. Sometimes, when a destination goes offline, all of the keys are allocated to new primary destinations. Typical known network switches only have the concept of a single destination. However, typical known network switches do not have a concept of including more than one destination per key.

The initial destination is the current destination to which the traffic is being redirected by the switch. The backup destination is the replacement destination should the initial destination go offline. Having a initial destination and backup destination is required for redundancy (i.e. for fast failover).

In a network switch, should a destination go offline, then the keys whose initial destination is that destination will need to be reallocated to a new destination. The new destination will be the current backup destination. For the remaining keys for the other online destinations, the primary destination remains unchanged. However, for those keys whose backup destination is the offline destination, new backup destinations will need to be reallocated. It has been discovered that current switch hash functions do this, but in addition the known current switch has functions which reallocate backup destinations even for those keys whose backup destinations are not the offline destination.

This causes a problem for middleware software design, which typically is designed so that most keys will not need reallocating (for either initial or backup destinations) except for those keys whose initial or backup destinations have gone offline.

SUMMARY

Aspects of the present invention disclose a method, system and program product for reallocating only those primary and secondary destinations that need to be reallocated on an even-handed basis, so there is at most a difference of one in the number of buckets allocated to each segmented server before and after re-allocation.

A system, method and program product for reallocating primary and secondary destinations in load balancing for one or more segmented servers, includes a step of a computer allocating a server number to each segmented server in numerically increasing order, starting at a first segmented server, and integer counting up to a last segmented server. The computer allocates primary and secondary destinations to buckets to two or more data structures in a numerically increasing order, starting at a first segmented server, and integer counting up to a last segmented server. The computer creates a data structure designated to each segmented server. The computer loops back to the first segmented server after the last data structure of the last segmented server is allocated the primary destination. The computer evenly allocates buckets to two or more data structures, so that no data structure has more than one additional bucket than the other data structure.

The computer allocates secondary destinations of the buckets, so that the current segmented server number is passed over, and so that the computer loops back to the first segmented server number after the last segmented server number is allocated as the secondary destination. Responsive to a failure of a segmented server, the computer reallocates secondary destinations to the primary destinations of the buckets of the data structures that have the failed segmented server. The computer reallocates the secondary destinations to the beginning and end of the data structures of each of the operative segmented servers, cycling back from the next value of the secondary destination of the failed segmented server to balance the number of entries in each data structure.

BRIEF DESCRIPTION OF THE SEVERAL VIEWS OF THE DRAWINGS

FIG. 6 depicts an example of data structures illustrating the primary and secondary destinations allocated to buckets of a segmented server that goes offline.

DETAILED DESCRIPTION

The present invention will now be described in detail with reference to the figures.

Figure 1:
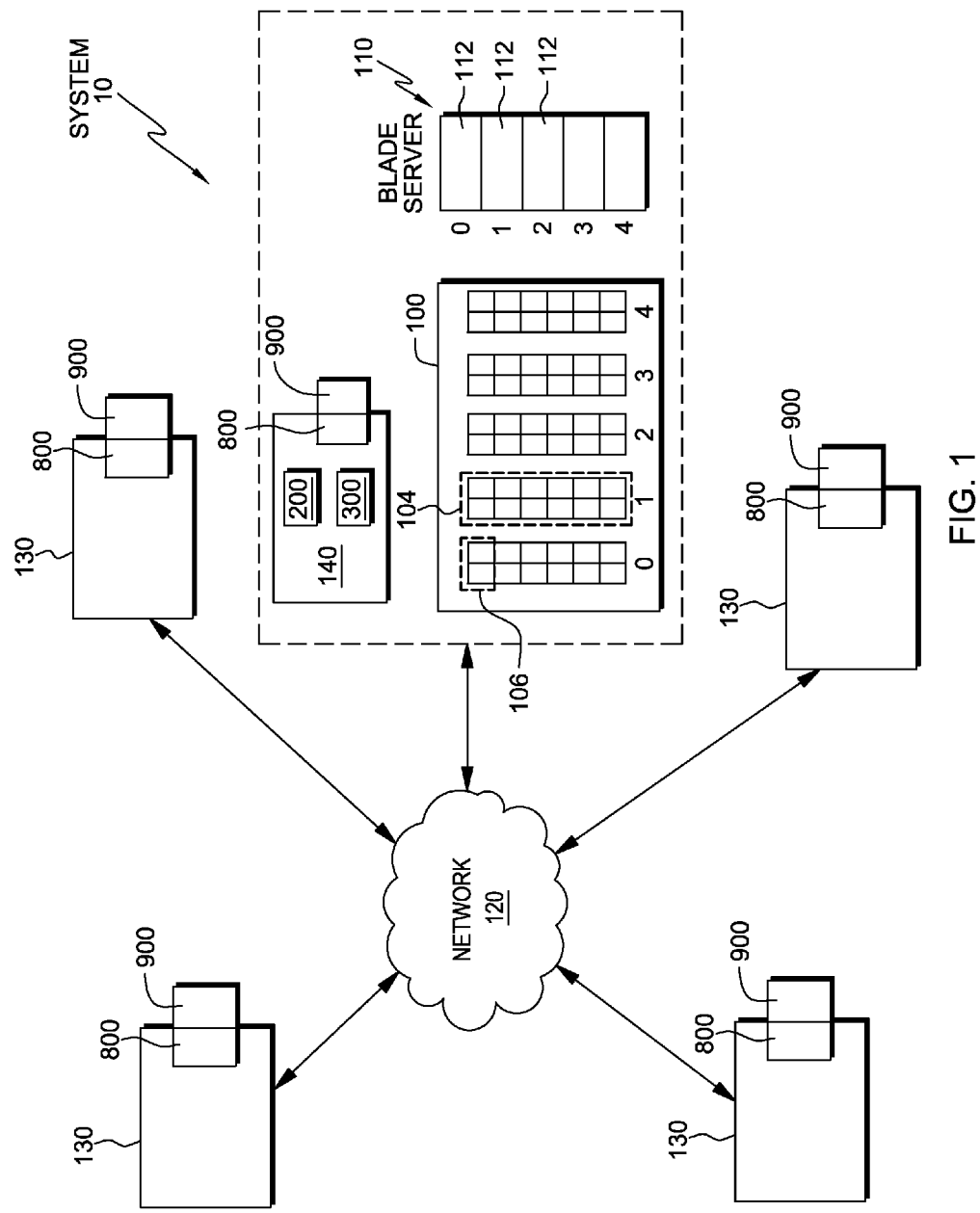
FIG. 1 depicts a network switching system for reallocating secondary destinations according to an embodiment of the present invention.

FIG. 1 depicts a network switching system for reallocating secondary destinations in which embodiments may be implemented. It should be appreciated that FIG. 1 provides only an illustration of one implementation and does not imply any limitations with regard to the environments in which different embodiments may be implemented. Many modifications to the depicted environments may be made.

In one example depicted in FIG. 1, a network switching system 10 includes a virtual server 100, a segmented server system 110 with one or more segmented servers 112, and a server computer 140. Server computer 140 includes an allocation program 200, which allows a computer to allocate primary and secondary destinations located within buckets 106 of one or more data structures 104 designated for each segmented server 112. The server computer 140 also includes a reallocation program 300, which allows the server computer to reallocate primary and secondary destinations located within the buckets 106 of data structures 104 designated for each segmented server 112. Each bucket 106 is used to redirect external network traffic from one or more keys. The network switching system 10 is connected to one or more computers 130 through a network 120, which acts as a medium for providing a communication link between the networking switching system and the one or more computers 130.

The virtual server 100 includes one or more data structures 104 with one or more buckets 106 designated to each segmented server 112. Each bucket 106 includes a primary and secondary destination. Each bucket 106 functions to redirect external network traffic from one or more keys to one of the segmented servers 112. The keys are normally based on a source IP address or combination of IP addresses from one or more computers 130.

Using exemplary embodiments, if a segmented server (destination) goes offline, keys currently allocated to that segmented server are distributed amongst the remaining online destinations. The primary destination of bucket 106 is the current destination that the traffic is being redirected to by the virtual server 100, and the secondary destination is the replacement destination should the primary destination go offline. It is important to note that known network switches typically do not include the concept of a secondary destination.

Exemplary embodiments of the present invention of the virtual server 100 thus initially allocate both the primary destination and the secondary destination for each bucket 106, and when a destination goes offline, the computer program allocates a new primary destination and/or secondary destination for each bucket, if the initial primary and/or secondary destination are the offline segmented server 112. Exemplary embodiments view the virtual server 100 as if it allocates a primary destination and a secondary destination for every bucket 106.

In exemplary embodiments, for a given configuration of destinations, the primary and secondary destinations for a given bucket 106 are well defined and known at the time the primary destination is allocated to the bucket. The predetermined allocation of primary and secondary destinations for each bucket 106 is important for setting up certain software entities (otherwise known as middleware) where both the primary and secondary destinations need to be known upfront. Additionally, having a primary and secondary destination is required for redundancy, i.e. for fast failover. Exemplary embodiments allow the middleware software to react in a timely manner when segmented servers go offline.

In some examples, a segmented server system 110 (in one example, a bladecenter or bladeserver) with one or more segmented servers 112 (in one example, blades) processes traffic from many computers 130. The networking function for the segmented server system 110 is provided by the virtual server 100, which provides the additional function of load balancing using the reallocation program 300. Data traffic from a network 120 is redirected through the bladecenter or bladeserver 110. Virtual server 100 in the bladecenter or bladeserver 110 is directed by the allocation program 200 and reallocation program 300 regarding the use of the source IP address (SIP) for load balancing traffic across the blades 112. Since data traffic from each user session and/or computer 130 has a unique SIP, the virtual server 100 provides session affinity to blades 112. Each blade 112 processes the data traffic routed to it by the virtual server 100 and therefore receives and processes a subset of the user sessions. The allocation program 200 may convert SIPs to keys, and the keys may map substantially uniformly to buckets 106. Buckets 106 are allocated substantially uniformly to the blades 112 in an initial configuration. When a blade 112 fails or goes offline, each bucket associated with a set of keys that is designated to the offline blade is redistributed to one of the other dedicated data structures 104 across the remaining online blades, but buckets 106 associated with other sets of keys designated to online segmented servers are not reallocated.

Exemplary methods allow computer 140 to reallocate secondary destinations for buckets 106 in the data structures 104, following the failure of a primary destination, in a manner that both limits the number of changes and also ensures there is a high probability the workload will remain substantially balanced in the case of a subsequent primary destination failure. The number of changes needs to be limited in order that the service can ensure the state for any in-flight sessions is made available to the new secondary destination. Changing all the secondary destination mappings would potentially lead to large amounts of data movement and potential for poor system response. In some examples, ensuring continued balance of the workload is an objective given that the virtual server 100 is acting as a load balancer.

Figure 2:
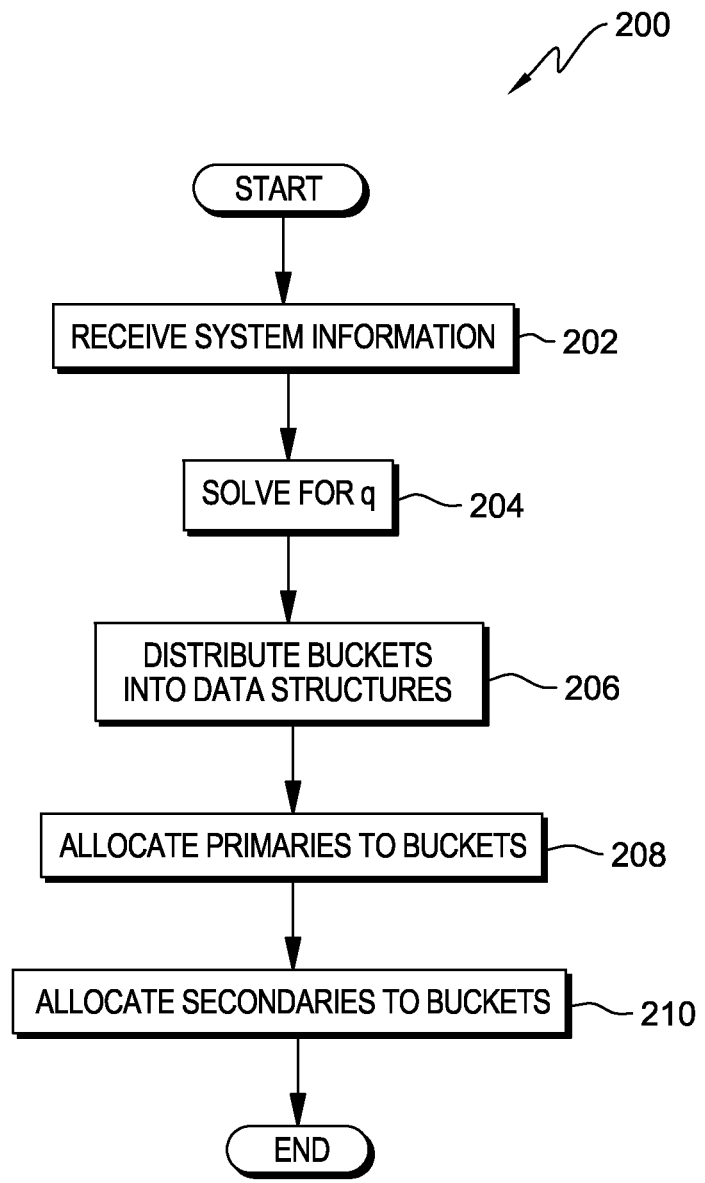
FIG. 2 is a flow chart illustrating the steps of a program installed in a computer of FIG. 1 for allocating primary and secondary destinations to buckets located within a data structure.

FIG. 2 is a flow chart illustrating the steps of the allocation program 200 installed in a computer of FIG. 1 for allocating primary and secondary destinations to buckets located within a data structure. In step 202, the allocation program 200 receives system information, such as, for example, the program receives the number of segmented servers (n) and the number of buckets (N) that are to be allocated. In other examples, additional system information may be received by the allocation program at this time. In step 204, the allocation program 200 solves for q, as follows:

$$q = N \bmod n \qquad \text{Equation 1}$$

By solving for the variable q, the program will later utilize the variable during the allocation of primary and secondary destinations for each bucket 106 in the data structures 104. In step 206, the allocation program 200 substantially evenly distributes the buckets 106 into the data structures 104 designated to form two or more data structures within the virtual server 100. No data structure 104 should have more than one additional bucket 106 allocated to that data structure than any other data structure. In step 208, the allocation program 200 allocates the same primary destination for the buckets 106 located in each data structure 104. The primary destination for each bucket 106 designated to each data structure 104 will be the same value that corresponds to the segmented server 112 designated to that data structure. In an example, the primary destination for each bucket 106 for the first data structure designated to segmented server number zero (0) will have a value of zero.

In step 210, the allocation program 200 allocates secondary destinations for the keys into buckets 106 within the virtual server 100. Allocation program 200 allocates the secondary destinations one data structure 104 at a time. In a first data structure 104 designated to the first segmented server, starting from a first bucket 106 located at the beginning of the data structure, the allocation program 200 allocates secondary destinations starting at q, in increasing order, passing over the allocation of a secondary destination to buckets within the data structure if the secondary destination is the same number of the data structure of the segmented server to which the secondary destination is currently being allocated. This assures that the allocation program 200 does not allocate the segmented server 112 as both primary and secondary destination for a bucket. When the allocation program 200 reaches the last segmented server number when allocating secondary destinations, the allocation program loops back and starts allocating from the first segmented server number (zero in this example) in increasing order down the data structures as before.

Figure 3:
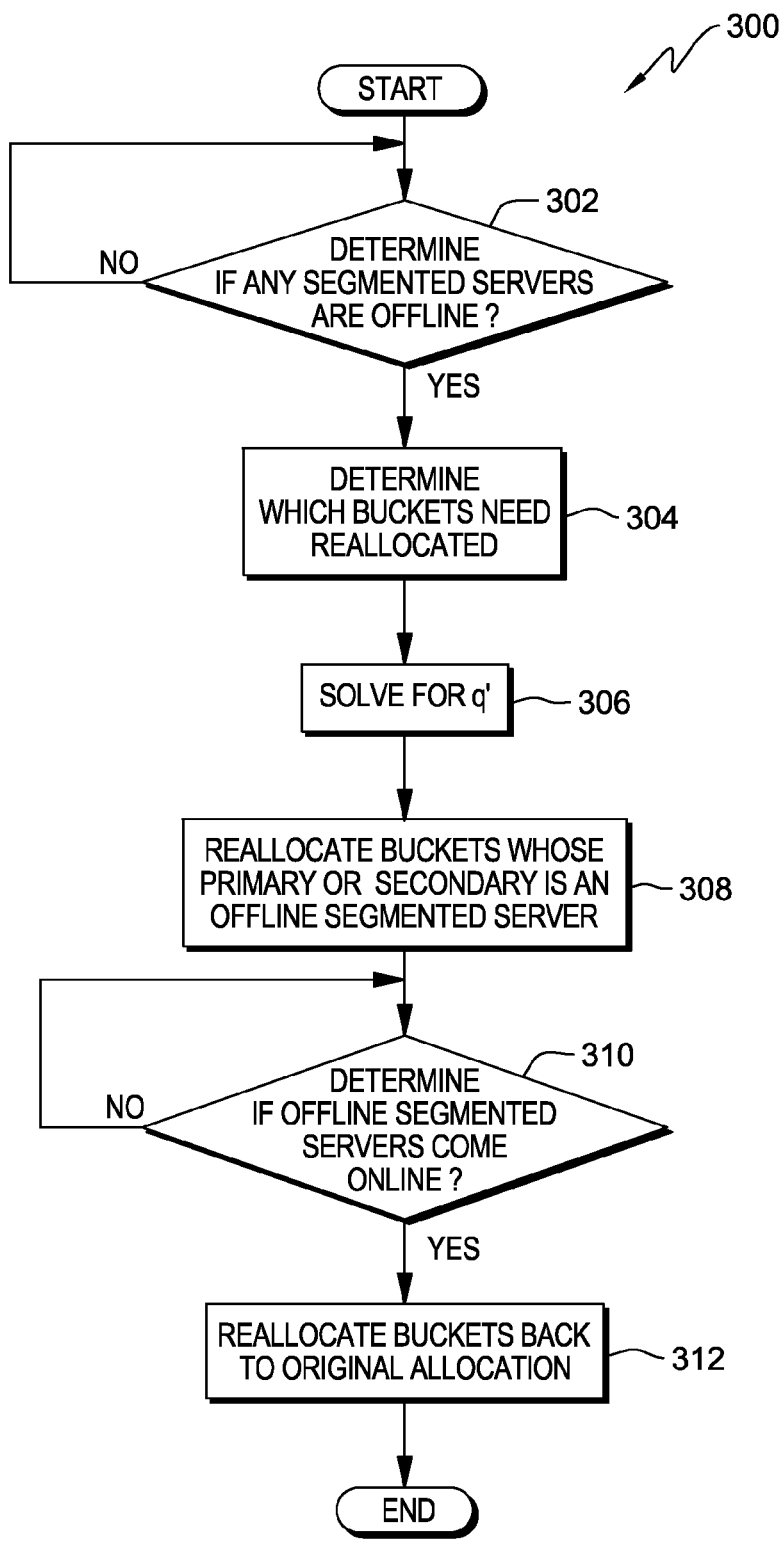
FIG. 3 is a flow chart illustrating the steps of a program installed in a computer of FIG. 1 for reallocating buckets located within one or more data structures.

FIG. 3 is a flow chart illustrating the steps of the reallocation program 300 installed in a computer of FIG. 1 for reallocating buckets located within one or more data structures. In step 302, the reallocation program 300 determines if any of the segmented servers 112 are currently offline. In step 302, if all the segmented servers are online, the reallocation program 300 loops back to determine if all the segmented servers are online again. The reallocation program 300 is constantly determining if any of the segmented servers 112 are currently offline. However, in other embodiments, the reallocation program 300 may have a time delay between determinations. In step 302, if there are any segmented servers offline, the reallocation program 300 determines which buckets 106 need to be reallocated, in step 304, i.e. which buckets 106 have a primary or secondary destination associated with the offline segmented server 112. In step 306, the reallocation program 300 solves for q'. By solving for the variable q', the reallocation program 300 will later utilize the variable during the reallocation of primary and secondary destinations. The value of q' is a value that should a second segmented server go offline, the primary destinations will stand to be substantially evenly distributed to the online segmented servers to promote a substantially similar load on each of the segmented servers.

In step 308, the reallocation program 300 reallocates the buckets 106 now having offline segmented servers 112 as the primary and secondary destination. The reallocation program 300 may reallocate the buckets 106 with secondary destination of the offline segmented server first, then the reallocation program reallocates the buckets having the primary destination as the offline segmented server 112. In step 310, the reallocation program 300 determines if any of the offline segmented servers 112 come online. In step 310, if offline segment server 112 comes online again, in step 312 the reallocation program 300 reallocates the buckets 106 of the data structures 104 back to the original allocation of the buckets of the original data structures determined by the allocation program 200. In step 310, if the offline segmented server 112 is still offline, the reallocation program 300 loops back to determine if the offline segmented server is still offline. The reallocation program 300 is constantly determining if any of the offline segmented servers 112 are still currently offline. However, in other embodiments, the reallocation program 300 may have a time delay between the determinations.

FIGS. 4-9 depict an example of how to initially allocate primary and secondary destinations to buckets 106 in data structures 104, followed by how to reallocate primary and secondary destinations to the buckets in the data structures designated to one or more segmented servers 112 when an additional segmented server goes offline. In this example, (N) number of buckets and (n) number of destinations are considered, which for simplicity are understood in terms of destination segmented servers of a segmented server system.

Figure 4:
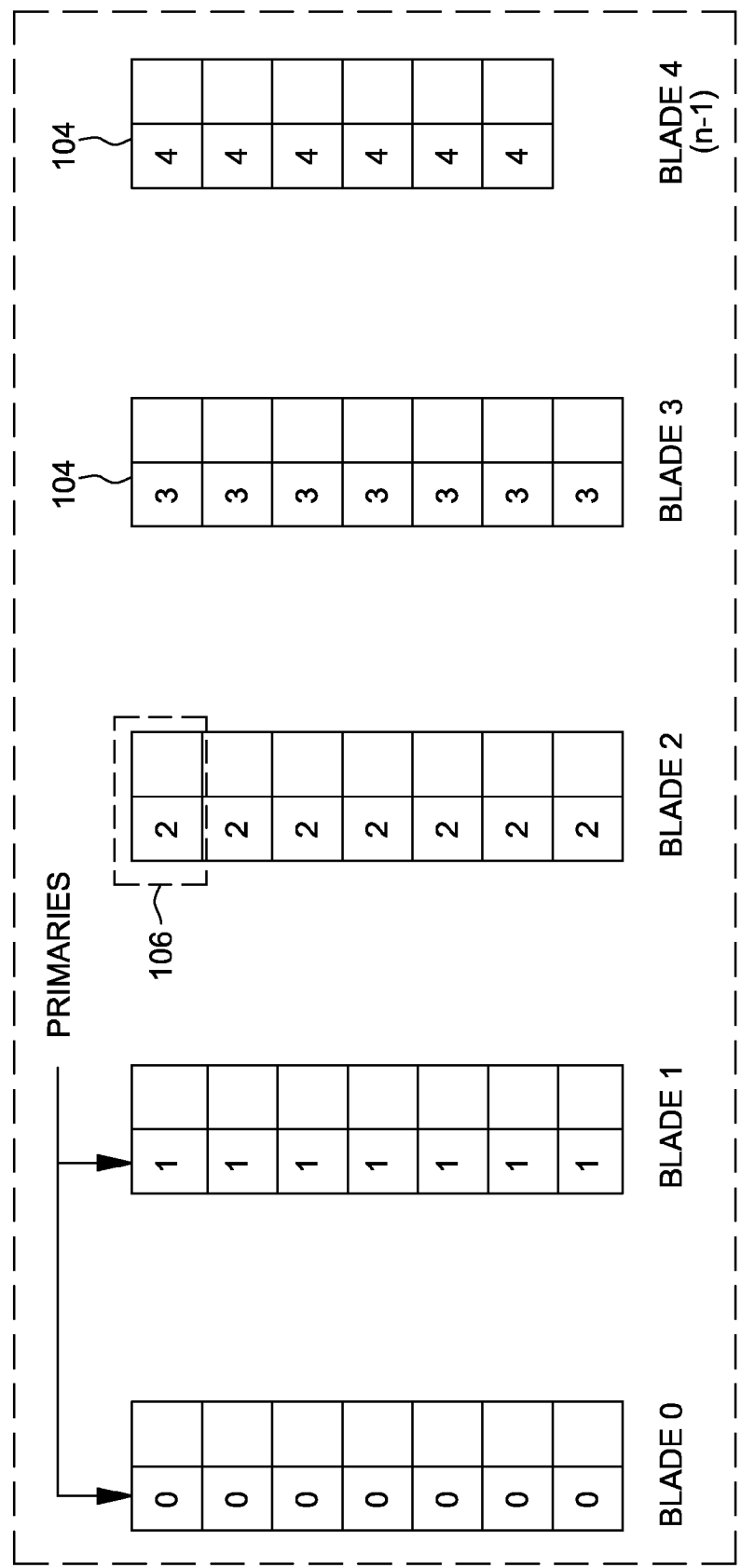
FIG. 4 depicts an illustrative example of data structures with primary destinations allocated to buckets.

In the example, depicted in FIG. 4, the allocation program 200 evenly allocates buckets 106 to the segmented servers 112 in one or more data structures 104 to assure that an approximately uniform amount of traffic is handled by each segmented server. Primary destinations are allocated to buckets 106 that constitute the data structure 104 designated to each segmented server 112. In this example, the first primary destination is allocated to a first bucket associated with the data structure of a first segmented server (here blade (0)). Thereafter, the following primary destinations are allocated to data structures 104 designated to each segmented server, starting at a second blade and increasing in number, and counting up to the last blade (here (n−1)), then cycling back to the first blade when primary destinations for buckets 106 are allocated to an entire first row of buckets in each data structure designated to each segmented server.

After the allocation program 200 allocates primary destinations to all of the buckets 106, the allocation program remembers the next primary destination to be allocated. In this example, the next primary destination to be allocated is considered to be (q), which is equal to N mod n.

In examples, when q≠0, the data structures 104 of different segmented servers 112 is unbalanced and not have equivalent amounts of buckets 106, as depicted in FIGS. 4-9. When q≠0, for any segmented servers with a number larger than q, there is one less bucket for those segmented servers. In another example, when q=0, there is an even distribution of buckets 106 across all of the data structures 104 designated for each segmented server 112.

Figure 5:
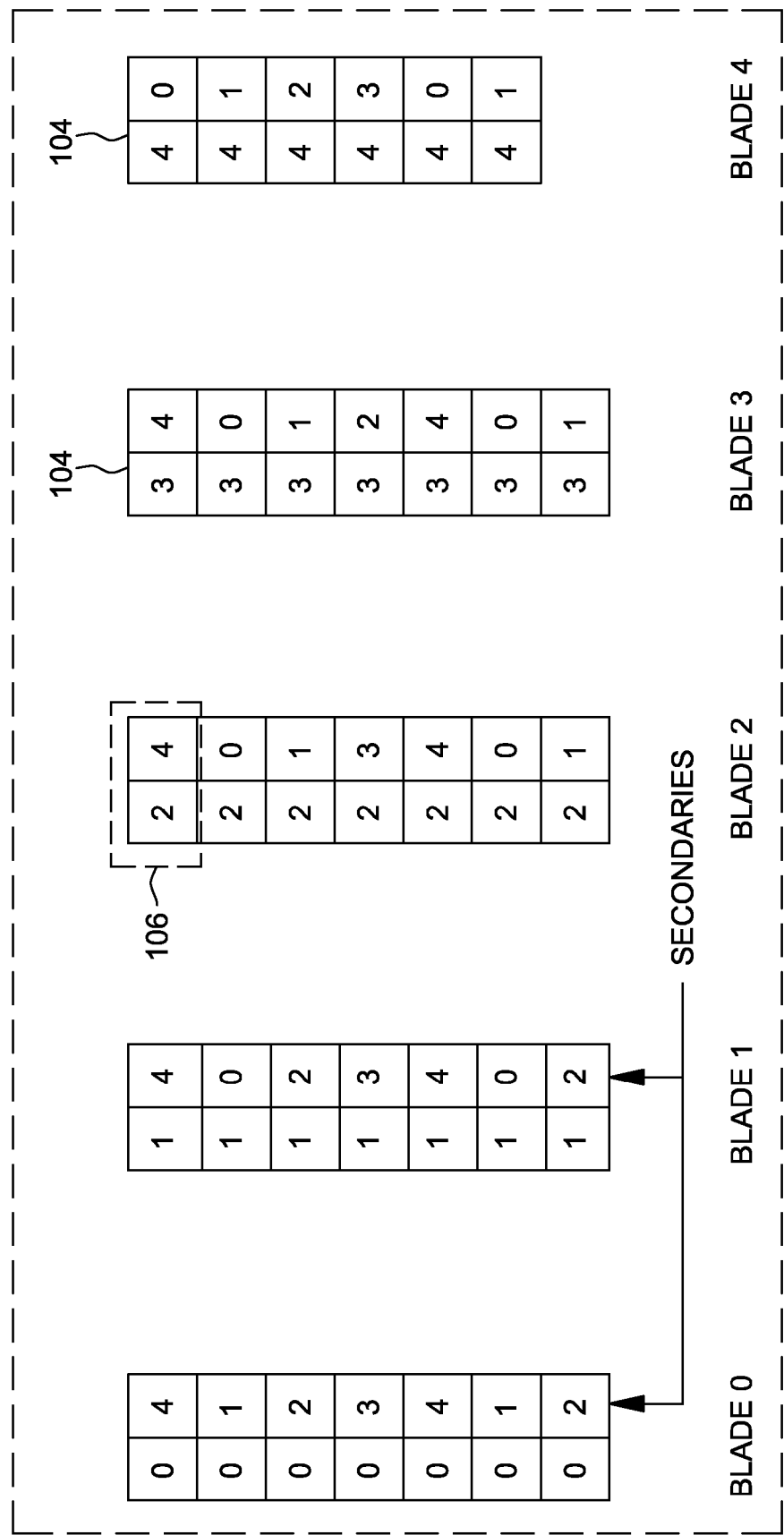
FIG. 5 depicts an illustrative example of data structures with primary and secondary destinations allocated to buckets.

As depicted in FIG. 5, after the allocation program 200 allocates primary destinations to each bucket 106 within data structures designated to each segmented server, secondary destinations are allocated one data structure 104 at a time. In a first data structure 104 of the first segmented server 112, starting from a first bucket 106 located at the beginning of the data structure and working downward through the data structure, the allocation program 200 allocates secondary destinations starting at q, in increasing order, passing over the allocation of a secondary destination to a bucket within the data structure, if the secondary destination is the same number of the data structure designated to the segmented server to which the secondary destination is currently being allocated. This assures that the allocation program 200 does not allocate the segmented server 112 as both primary and secondary destination for a bucket. When the allocation program 200 reaches the last segmented server number when allocating secondary destinations, the allocation program loops back and starts allocating from the first segmented server number (zero in this example) in increasing order down the data structure 104 as before. In a similar manner, the allocation program 200 allocates primary destinations to each bucket 106 within the remaining data structures 104 designated to each of the additional segmented servers.

The allocation of secondary destinations by the allocation program 200 in the aforementioned fashion ensures that when a segmented server 112 goes offline and/or down, the new primary destinations are balanced to a substantial degree because the allocation of secondary destinations continues from where the allocation of secondary destinations left off at (q−1). In this example, the secondary destinations of any segmented server are reallocated as primary destinations in the sequence continuing from the original data structure 104 of primary destinations at q. The data structure 104 finishes at a new value for the next primary destination (for example q').

To accomplish the need for the new data structure 104 to finish at a new value for the next primary destination, secondary destinations of the updated data structures designated to each online segmented server 112 start from q' instead of q. The value of q' is a value that when a second segmented server goes offline, the primary destinations stand to be substantially evenly distributed to the online segmented servers to promote substantially similar load on each of the segmented servers. In this example, when the secondary destinations of an offline segmented server 112 are reallocated, the other secondary destinations of buckets 106 that do not need reallocated (buckets of online segmented servers) are undisturbed.

If an online segmented server 112 goes offline, the reallocation program 300 reallocates the buckets 106 having primary or secondary destinations that are now offline segmented server. In this example, the reallocation program 300 reallocates the buckets 106 having secondary destination as the offline segmented server 112 first, then the reallocation program reallocates the buckets having the primary destination as the offline segmented server. However, in other examples, the reallocation program 300 may reallocate the buckets 106 with the primary destination as the offline segmented server first, then reallocate the buckets with the secondary destination as the offline segmented server, and indeed reallocation may occur in any ordering of the buckets that include an offline destination.

Figure 6:
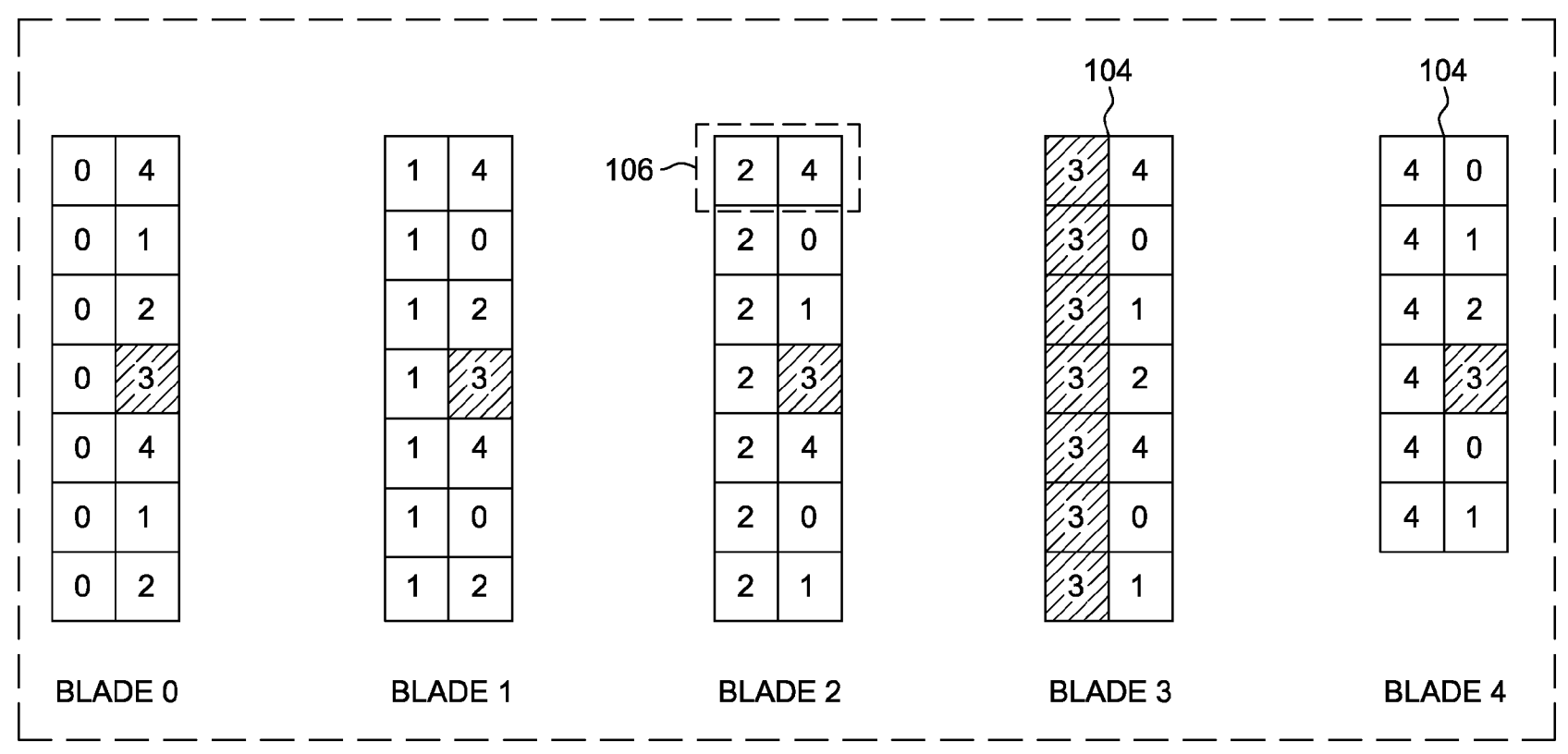
Figure 7:
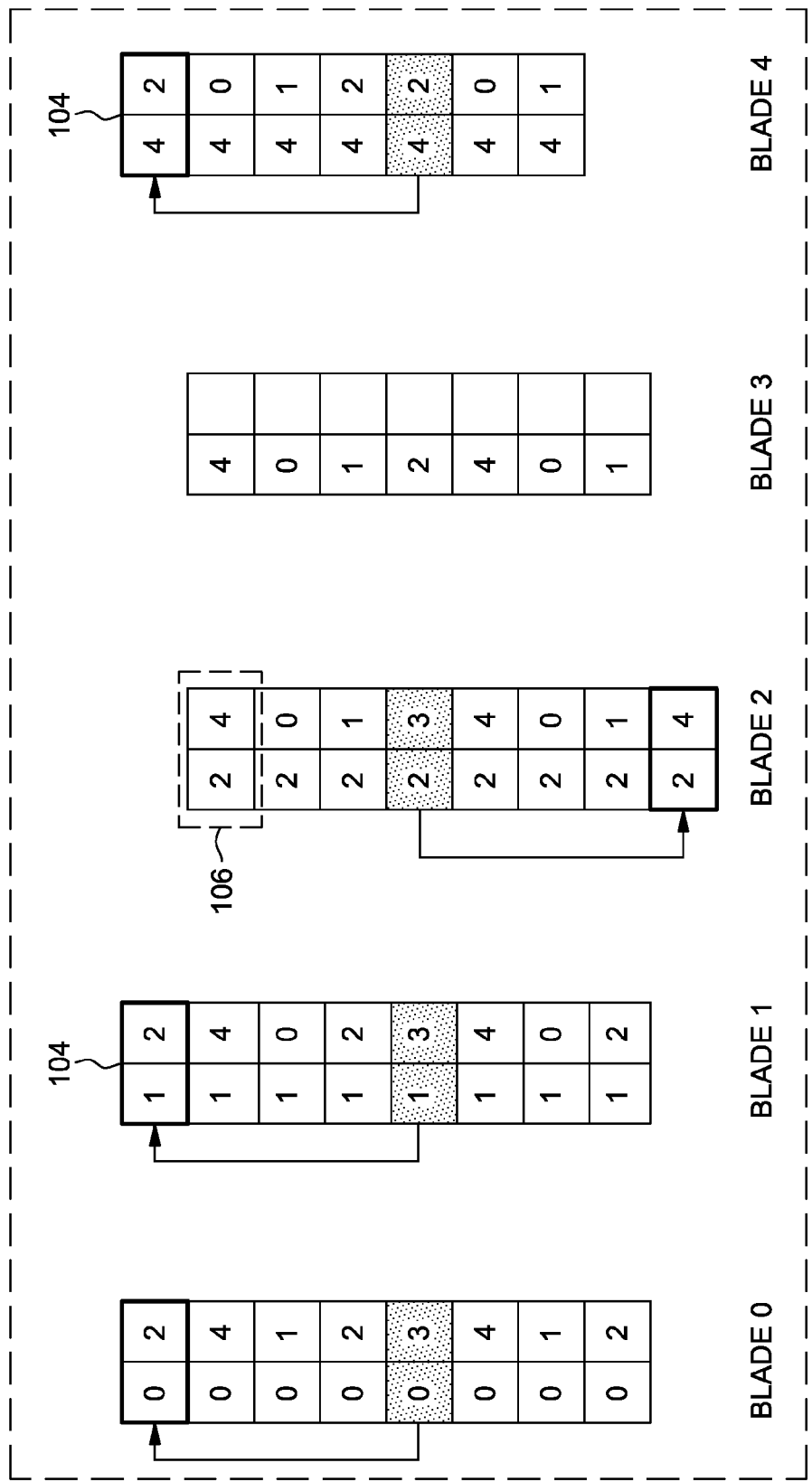
FIG. 7 depicts an example of data structures illustrating the reallocation of primary and secondary destinations to buckets designated to the segmented server that goes offline.

As illustrated in FIG. 6, in each individual data structure 104 of each online segmented server 112, the reallocation program 300 unattaches each bucket 106 with the secondary destination as the offline segmented server from the initial location in the data structure 104. The reallocation program 300 inserts or reallocates the bucket 106 to the beginning (here the top) of the data structure designated to each segmented server, as depicted in FIG. 7. The reallocation program 300 reallocates buckets 106 whose secondary destination is the offline segmented server 112 by cycling backwards in sequence, skipping the current segmented server number and all numbers of offline segmented servers, in addition to looping back to the last online segmented server number when the first online segmented server number is reached, allocating the buckets' secondary destinations to these values, until the secondary destination of the bucket at the beginning of the data structure 104 of the online segmented server has a value of q'. However, if the value of q' is the same as the number of the online segmented server, as seen in the third segmented server data structure 104 of FIG. 7, the reallocation program 300 reallocates buckets 106 to the beginning of the data structure 104 as before, but only as far as the server number immediately after q'. In the example, no buckets need to be added. The reallocation program 300 determines there are additional buckets 106 to reallocate in the data structure 104 after the beginning of each data structure designated to each segmented server has a beginning bucket that includes secondary destination with a value of q'. If there are additional buckets 106 to reallocate, the reallocation program 300 unattaches and reattaches buckets to the bottom of the end of the data structure by cycling forward through the online segmented server values. The reallocating program 300 allocates secondary destinations of the buckets 106 in each data structure 104 the online segmented server values so that the secondary destinations are in sequential order, skipping the current segmented server number and all numbers of offline segmented servers, in addition to looping back to the first online segmented server number when the last online segmented server number is reached, as depicted in FIG. 7.

Figure 8:
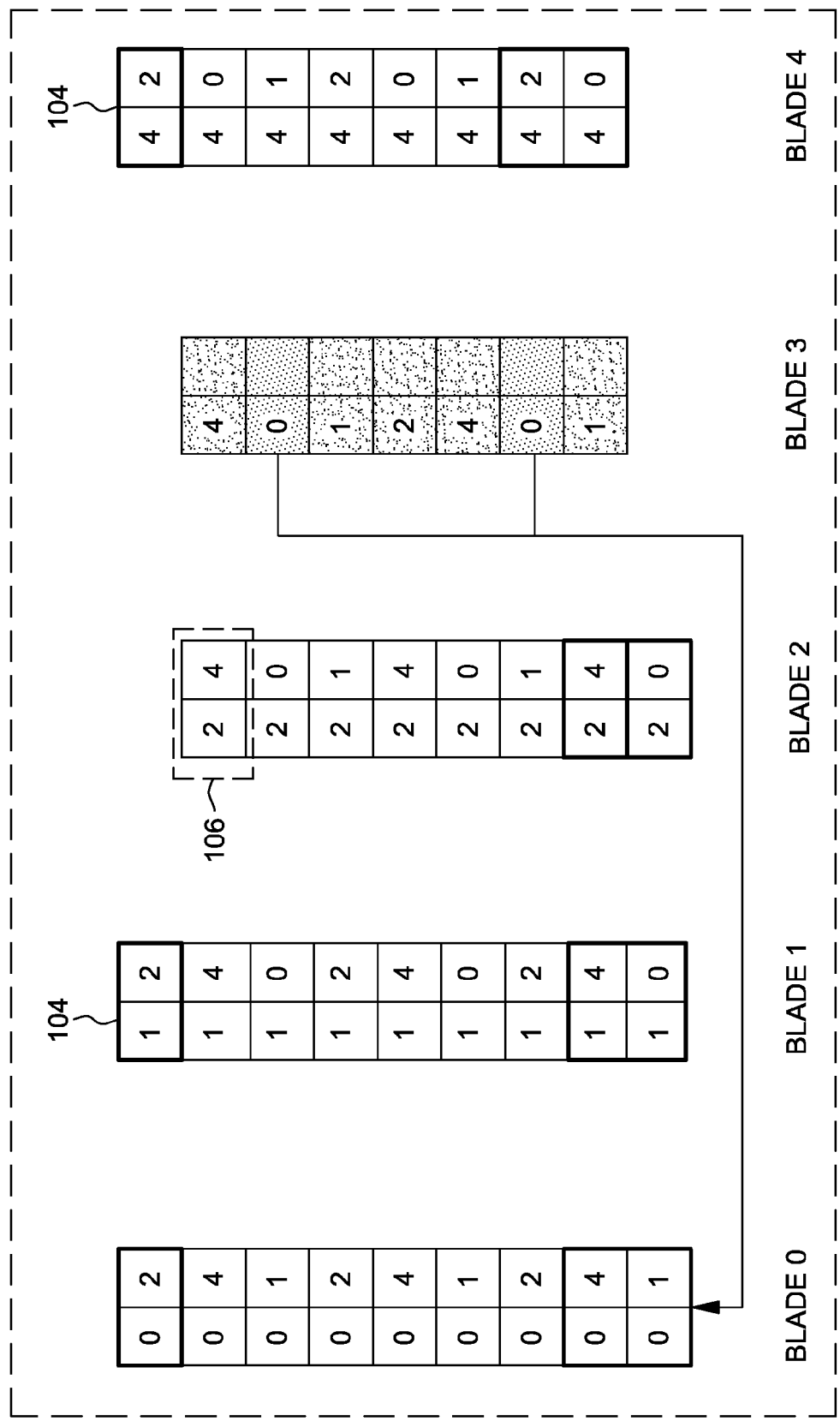
FIG. 8 depicts an illustrative example of data structures illustrating the reallocation of primary and secondary destinations to buckets designated to the segmented server that goes offline.

After the reallocation program 300 reallocates buckets 106 having the secondary destination as the offline segmented server, the reallocation program 300 reallocates the buckets of the offline segmented server (buckets whose initial primary destination is the offline segmented server). The reallocation program 300 reallocates secondary destinations of the buckets 106 of the offline segmented server to primary destination of the same bucket in the data structure 104 of the offline segmented server, as depicted in FIG. 8. After the new primary destinations for the buckets 106 of the data structure 104 of the offline segmented server are allocated, the reallocation program 300 reallocates the buckets to the corresponding data structure of the online segmented servers, as depicted in FIG. 8.

Similar to the reallocation of the buckets 106 having the secondary destination as the now offline segmented server, the reallocation program 300 reallocates buckets to the beginning of the data structure 104 for each online segmented server. If the secondary destination of the bucket at the beginning of the data structure does not already have the value of q', the reallocation program 300 reallocates buckets having the primary destination as the offline segmented server by cycling backwards in sequence, skipping the current segmented server number and all numbers of offline segmented servers, in addition to looping back to the last online segmented server number when the first online segmented server number is reached, allocating the buckets' secondary destinations to these values, until the secondary destination of the bucket at the beginning of the data structure of the online segmented server has a value of q'. The reallocation program 300 determines if there are additional buckets 106 to reallocate in the data structure 104 after the beginning of each data structure for each segmented server has a beginning bucket that includes secondary destinations with a value of q'. If there are additional buckets 106 to reallocate, the reallocation program 300 unattaches and reattaches buckets to the bottom of the end of the data structure by cycling forwards through the online segment server values. The reallocation program 300 allocates secondary destinations to each bucket of each segmented server so that the secondary destinations are in sequential order, skipping the current segmented server number and all numbers of offline segmented servers, in addition to looping back to the first online segmented server number when the last online segmented server number is reached, as depicted in FIG. 8.

Figure 9:
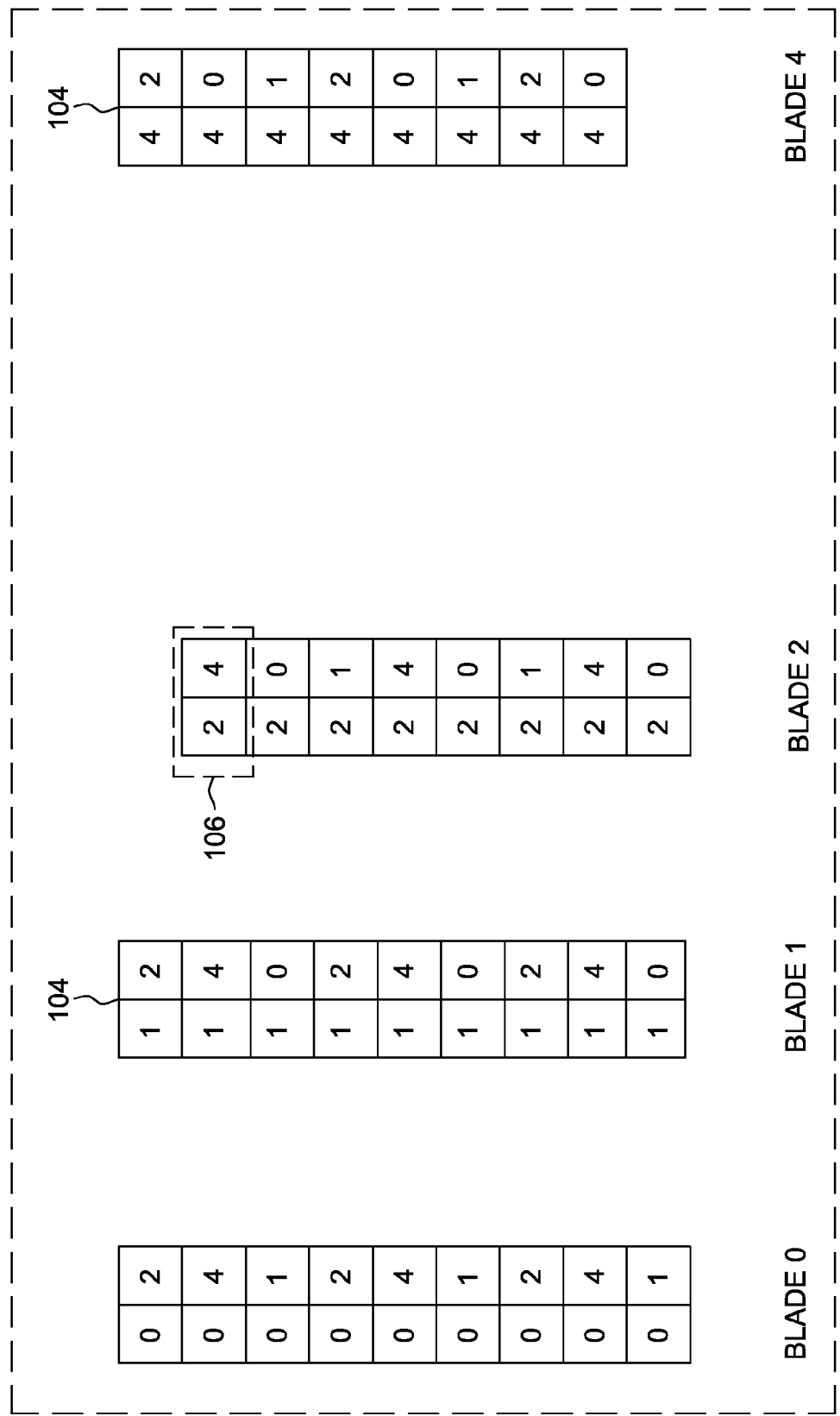
FIG. 9 depicts an example of data structures illustrating the reallocation of primary and secondary destinations to buckets designated to the segmented server that goes offline.

Once the reallocation program 300 reallocates the buckets 106 with the primary or secondary destinations that are the now offline segmented server, the new data structures for each segmented server are substantially balanced, with at most one additional or fewer number of buckets in each data structure comparable to the other data structures, as depicted in FIG. 9. Therefore, if another segmented server goes offline, when the reallocation program 300 reallocates the buckets 106 with the primary or secondary destination that is the now offline segmented server, the reallocation of buckets are substantially balanced so that each of the segmented servers sustain substantially similar amounts of traffic during operation. The aforementioned method allows for the reallocation of only those buckets that require a primary and/or secondary destination to be reallocated, without reallocating buckets that do not require reallocation.

The method may be extended to handle reintegration of a new segmented server within the virtual server 100. In this example, the aforementioned method is reversed. In this example, the reallocation program 300 first determines the new q' and moves earlier buckets from the top of each data structure of each segmented server to the bottom of each data structure of each segmented server, until the top bucket of the data structure has a secondary destination with a value of q'. Additionally, for each segmented server data structure, the reallocation program 300 selects buckets with the new secondary destination (the new segmented server value) from the bottom of the data structure order, and the buckets are introduced or inserted into the sequence of the data structure so that all existing data structures of the segmented servers include secondary destinations in the desired sequence, starting at the data structure of the last segmented server. In this example, the reallocation program 300 allocates the new segmented server buckets primary destinations, in order from the bottom of each data structure. The reallocation program reallocates the buckets of each data structure designated to each segmented server retains the desired sequence of ordering secondary destinations, as aforementioned. Similar to the method of reallocating primary and secondary destinations when a segmented server goes offline, examples of the method allow new destinations to be allocated primary and secondary destinations with minimal disruption to existing buckets.

Exemplary embodiments of the present invention allocate secondary destinations while simultaneously allocating primary destinations by first allocating the primary destinations in a consecutive sequence, and then allocating the secondary destinations by continuing a similar sequence in buckets. Examples allocate the primary and/or secondary destinations so that each segmented server has approximately the same amount of primary and/or secondary destinations allocated thereto for redundancy and for similar apportionment of traffic for each segmented server.

Examples reallocate the primary and secondary destinations of the segmented servers when one or more segmented servers goes offline. When a segmented server goes offline, examples of the reallocation of the primary and secondary destinations do not cause all of the secondary destinations to be reallocated. Furthermore, examples allow for the reintegration of a new destination if the new destination comes online or a previously offline segmented server (destination) comes back online. If the previously offline segmented server comes online, then the method may be reversed to allow the previously online segmented server to be allocated primary and secondary destinations with minimal disruption to existing buckets.

Figure 10:
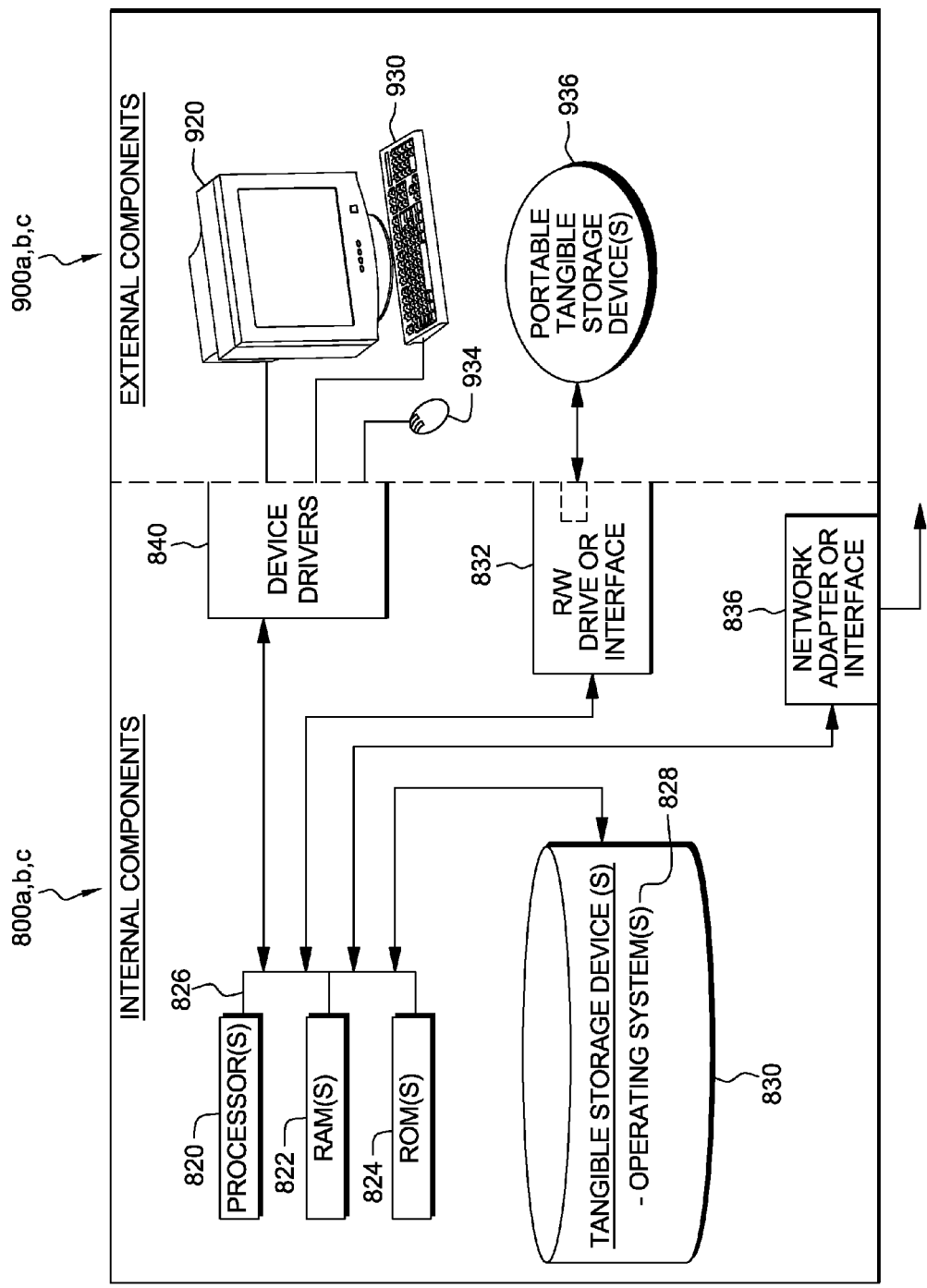
FIG. 10 depicts a block diagram of internal and external components of a data processing system in accordance with an illustrative embodiment.

Computers 130 and 140 include respective sets of internal components 800a,b,c and external components 900a,b,c, illustrated in FIG. 10. Each of the sets of internal components 800a,b,c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 200 and 300 (for computer 140) are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 200 and 300 (for computer 140) can be stored on one or more of the respective portable computer-readable tangible storage devices 936, read via the respective R/W drive or interface 832 and loaded into the respective hard drive 830.

Each set of internal components 800a,b,c also includes a network adapter or interface 836 such as a TCP/IP adapter card. The programs 200 and 300 (for computer 140) can be downloaded to the respective computers from an external computer or external storage device via a network (for example, the Internet, a local area network or other, wide area network) and network adapter or interface 836. From the network adapter or interface 836, the programs are loaded into the respective hard drive 830. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 934. Each of the sets of internal components 800a,b,c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The programs can be written in various programming languages (such as Java, C++) including low-level, high-level, object-oriented or non object-oriented languages. Alternatively, the functions of the programs can be implemented in whole or in part by computer circuits and other hardware (not shown).

Based on the foregoing, a computer system, method and program product have been disclosed for allocating and reallocating primary and secondary destinations. However, numerous modifications and substitutions can be made without deviating from the scope of the present invention. Therefore, the present invention has been disclosed by way of example and not limitation.

What is claimed is:
1. A method for reallocating primary and secondary destinations in a virtual server for one or more segmented servers, the method comprising the steps of:
   a computer allocating buckets to at least two data structures designated to the one or more segmented servers, wherein one of the at least two data structures includes one less bucket than the other data structure;
   the computer allocating primary destinations to the buckets, wherein a number, the number identifying the bucket destinations, of each primary destination is the same as the server number of the segmented server the data structure is designated thereto;
   the computer allocating secondary destinations in a predetermined sequential order to the buckets of each of the at least two data structures;
   responsive to a failure of one of the one or more segmented servers, the computer reallocating the primary destinations and the secondary destinations of buckets with primary destinations and secondary destinations designated to an offline segmented server to one or more online segmented servers without adjusting buckets with primary destinations and secondary destinations designated to the one or more online segmented servers; and
   the computer reallocating the buckets that have reallocated primary destinations or secondary destinations to each a beginning and an end of the at least two data structures designated to each of the one or more online segmented servers, wherein reallocating the buckets includes,
   the computer determining a value of a next primary destination;

the computer detaching each bucket with the secondary destination as the offline segmented server from an initial location in each data structure;

the computer reattaching each bucket with the secondary destination as the offline segmented server to the beginning of each data structure; and the computer allocating secondary destinations to the reattached buckets in each data structure by cycling back in sequence, skipping the offline segmented server number and all numbers of additional offline segmented servers, and looping back to the last online segmented server number until the first online segmented server number is reached, allocating the secondary destinations of the reattached buckets to these numbers until the secondary destination of the reattached bucket at the beginning of each data structure of the online segmented servers has a number equal to the number of the next primary destination.

2. The method of claim 1, further comprising the step of:
the computer allocating a server number to each of the one or more segmented servers in numerically increasing order, starting at a first segmented server, and integer counting up to a last segmented server.

3. The method of claim 1, wherein the step of the computer allocating primary destinations includes,
the computer allocating buckets to the at least two data structures in a numerically increasing order, starting at a data structure designated to a first segmented server, and integer counting up to a data structure designated to a last segmented server, wherein the computer loops back to the data structure designated to the first segmented server after the last data structure designated to the last segmented server is allocated.

4. The method of claim 1, wherein the step of the computer allocating secondary destinations includes,
the computer allocating secondary destinations starting at a first bucket in a first data structure designated to a first online segmented server and working downward through the first data structure,
wherein the computer allocates the first bucket a the number equal to the remainder of the total number of buckets divided by the total number of online segmented servers, and the computer allocates the numbers in increasing order, passing over the allocation of a secondary destination to the buckets within the first data structure, if the secondary destination is the same number as the first data structure designated to the first online segmented server to which the secondary destination is currently being allocated.

5. The method of claim 1, wherein the step of the computer reallocating the buckets includes cycling back from the next value of the secondary destination designated to the offline segmented server to balance the number of entries in each data structure.

6. The method of claim 1, wherein the step of the computer reallocating the buckets further includes,
the computer determining one or more additional buckets to reallocate;
the computer detaching and reattaching the buckets to the end of each data structure;
the computer allocating secondary destinations to the buckets reattached to the bottom end of each data structure by cycling forward through the online segmented server number in sequential order, skipping the offline segmented server number and all numbers of additional offline segmented servers, and looping back to the first online segmented server number after the last online segmented server number is allocated.

7. A computer program product for reallocating primary and secondary destinations in a virtual server for one or more segmented servers, the computer program product comprising:
one or more computer-readable, tangible storage devices and program instructions stored on at least one of the one or more storage devices, the program instructions comprising;
program instructions to allocate buckets to at least two data structures designated to the one or more segmented servers, wherein one of the at least two data structures includes one less bucket than the other data structure;
program instructions to allocate primary destinations to the buckets, wherein a number, the number identifying the bucket destinations, of each primary destination is the same as the server number of the segmented server the data structure is designated thereto;
program instructions to allocate secondary destinations in a predetermined sequential order to the buckets of each of the at least two data structures;
program instructions, responsive to a failure of one of the one or more segmented servers, the computer reallocating the primary destinations and the secondary destinations of buckets with primary destinations and secondary destinations designated to an offline segmented server to one or more online segmented servers without adjusting buckets with primary destinations and secondary destinations designated to the one or more online segmented servers; and
program instructions to reallocate the buckets that have reallocated primary destinations or secondary destinations to each a beginning and an end of the at least two data structures designated to each of the one or more online segmented servers, wherein reallocating the buckets includes,
program instructions to determine a value of a next primary destination;
program instructions to detach each bucket with the secondary destination as the offline segmented server from an initial location in each data structure;
program instructions to reattach each bucket with the secondary destination as the offline segmented server to the beginning of each data structure; and
program instructions to allocate secondary destinations to the reattached buckets in each data structure by cycling back in sequence, skipping the offline segmented server number and all numbers of additional offline segmented servers, and looping back to the last online segmented server number until the first online segmented server number is reached, allocating the secondary destinations of the reattached buckets to these numbers until the secondary destination of the reattached bucket at the beginning of each data structure of the online segmented servers has a number equal to the number of the next primary destination.

8. The computer program product of claim 7, further comprising:
program instructions to allocate a server number to each of the one or more segmented servers in numerically increasing order, starting at a first segmented server, and integer counting up to a last segmented server.

9. The computer program product of claim 7, wherein the program instructions of allocating primary destinations includes, program instructions to allocate buckets to the at least two data structures in a numerically increasing order, starting at a data structure designated to a first segmented server, and integer counting up to a data structure designated to a last segmented server, wherein the computer loops back to the data structure designated to the first segmented server after the last data structure designated to the last segmented server is allocated.

10. The computer program product of claim 7, wherein the program instructions of allocating secondary destinations includes,
    program instructions to allocate secondary destinations starting at a first bucket in a first data structure designated to a first online segmented server and working downward through the first data structure,
    wherein the computer allocates the first bucket the number equal to the remainder of the total number of buckets divided by the total number of online segmented servers, and the computer allocates the numbers in increasing order, passing over the allocation of a secondary destination to the buckets within the first data structure, if the secondary destination is the same number as the first data structure designated to the first online segmented server to which the secondary destination is currently being allocated.

11. The computer program product of claim 7, wherein the program instruction of reallocating the buckets includes,
    program instructions to cycle back from the next value of the secondary destination designated to the offline segmented server to balance the number of entries in each data structure.

12. The computer program product of claim 7, wherein the program instructions of reallocating the buckets step further includes,
    program instructions to determine one or more additional buckets to reallocate;
    program instructions to detach and reattach the buckets to the end of each data structure;
    program instructions to allocate secondary destinations to the buckets reattached to the bottom end of each data structure by cycling forward through the online segmented server number in sequential order, skipping the offline segmented server number and all numbers of additional offline segmented servers, and looping back to the first online segmented server number after the last online segmented server number is allocated.

13. A computer system for reallocating primary and secondary destinations in a virtual server for one or more segmented servers, the computer system comprising:
    one or more processors, one or more computer-readable memories and one or more computer-readable, tangible storage devices;
    program instructions, stored on at least one of the one or more storage devices for execution by at least one of the one or more processors via at least one of the one or more memories, to allocate buckets to at least two data structures designated to the one or more segmented servers, wherein one of the at least two data structures includes one less bucket than the other data structure;
    program instructions, stored on at least one of the one or more storage devices for execution by at least one of the one or more processors via at least one of the one or more memories, to allocate primary destinations to the buckets, wherein a number, the number identifying the bucket destinations, of each primary destination is the same as the server number of the segmented server the data structure is designated thereto;
    program instructions, stored on at least one of the one or more storage devices for execution by at least one of the one or more processors via at least one of the one or more memories, to allocate secondary destinations in a predetermined sequential order to the buckets of each of the at least two data structures;
    program instructions, stored on at least one of the one or more storage devices for execution by at least one of the one or more processors via at least one of the one or more memories, responsive to a failure of one of the one or more segmented servers, the computer reallocating the primary destinations and the secondary destinations of buckets with primary destinations and secondary destinations designated to an offline segmented server to one or more online segmented servers without adjusting buckets with primary destinations and secondary destinations designated to the one or more online segmented servers; and
    program instructions, stored on at least one of the one or more storage devices for execution by at least one of the one or more processors via at least one of the one or more memories, to reallocate the buckets that have reallocated primary destinations or secondary destinations to each a beginning and an end of the at least two data structures designated to each of the one or more online segmented servers, wherein reallocating the buckets includes,
    program instructions to determine a value of a next primary destination;
    program instructions to detach each bucket with the secondary destination as the offline segmented server from an initial location in each data structure;
    program instructions to reattach each bucket with the secondary destination as the offline segmented server to the beginning of each data structure; and
    program instructions to allocate secondary destinations to the reattached buckets in each data structure by cycling back in sequence, skipping the offline segmented server number and all numbers of additional offline segmented servers, and looping back to the last online segmented server number until the first online segmented server number is reached, allocating the secondary destinations of the reattached buckets to these numbers until the secondary destination of the reattached bucket at the beginning of each data structure of the online segmented servers has a number equal to the number of the next primary destination.

14. The computer system of claim 13, further comprising:
    program instructions, stored on at least one of the one or more storage devices for execution by at least one of the one or more processors via at least one of the one or more memories, to allocate a server number to each of the one or more segmented servers in numerically increasing order, starting at a first segmented server, and integer counting up to a last segmented server.

15. The computer system of claim 13, wherein the program instructions of allocating primary destinations includes,
    program instructions, stored on at least one of the one or more storage devices for execution by at least one of the one or more processors via at least one of the one or more memories, to allocate buckets to the at least two data structures in a numerically increasing order, starting at a data structure designated to a first segmented server, and integer counting up to a data structure designated to a last segmented server, wherein the computer loops back to the data structure designated to the first segmented server after the last data structure designated to the last segmented server is allocated.

16. The computer system of claim 13, wherein the program instructions of allocating secondary destinations includes, program instructions, stored on at least one of the one or more storage devices for execution by at least one of the one or more processors via at least one of the one or more memories, to allocate secondary destinations starting at a first bucket in a first data structure designated to a first online segmented server and working downward through the first data structure, wherein the computer allocates the first bucket the number equal to the remainder of the total number of buckets divided by the total number of online segmented servers, and the computer allocates the numbers in increasing order, passing over the allocation of a secondary destination to the buckets within the first data structure, if the secondary destination is the same number as the first data structure designated to the first online segmented server to which the secondary destination is currently being allocated.

17. The computer system of claim 13, wherein the program instruction of reallocating the buckets includes, program instructions, stored on at least one of the one or more storage devices for execution by at least one of the one or more processors via at least one of the one or more memories, to cycle back from the next value of the secondary destination designated to the offline segmented server to balance the number of entries in each data structure.

18. The computer system of claim 13, wherein the program instruction to reallocate the buckets, further comprises program instructions, stored on at least one of the one or more storage devices for execution by at least one of the one or more processors via at least one of the one or more memories, to reallocate the buckets of the data structures back to the original allocation of the buckets of the original data structures when the offline segmented server comes back online.

* * * * *